United States Patent
Gill

(10) Patent No.: US 7,268,986 B2
(45) Date of Patent: Sep. 11, 2007

(54) DOUBLE TUNNEL JUNCTION USING SELF-PINNED CENTER FERROMAGNET

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 421 days.

(21) Appl. No.: 10/815,377

(22) Filed: Mar. 31, 2004

(65) Prior Publication Data

US 2005/0219770 A1 Oct. 6, 2005

(51) Int. Cl.
*G11B 5/39* (2006.01)

(52) U.S. Cl. ............... 360/324.2; 360/314; 360/324.11

(58) Field of Classification Search .......... 360/324.2, 360/314, 324.11
See application file for complete search history.

(56) References Cited

U.S. PATENT DOCUMENTS

| | | | |
|---|---|---|---|
| 5,757,056 A | 5/1998 | Chui | 257/421 |
| 6,069,820 A | 5/2000 | Inomata et al. | 365/171 |
| 6,185,080 B1 | 2/2001 | Gill | 360/324.2 |
| 6,243,288 B1 * | 6/2001 | Ishikawa et al. | 360/313 |
| 6,577,529 B1 | 6/2003 | Sharma et al. | 365/158 |
| 6,593,608 B1 | 7/2003 | Sharma et al. | 257/295 |
| 6,611,405 B1 | 8/2003 | Inomata et al. | 360/324.2 |
| 6,633,461 B2 | 10/2003 | Gill | 360/314 |
| 6,657,829 B2 | 12/2003 | Nakazawa et al. | 360/324.2 |
| 2002/0135946 A1 * | 9/2002 | Gill | 360/314 |
| 2002/0135952 A1 * | 9/2002 | Gill | 360/324.11 |
| 2002/0191451 A1 | 12/2002 | Kishi et al. | 365/200 |
| 2003/0062975 A1 | 4/2003 | Kishi et al. | 335/106 |
| 2003/0185046 A1 | 10/2003 | Nishiyama et al. | 365/158 |
| 2004/0008450 A1 | 1/2004 | Gill | 360/314 |
| 2004/0017639 A1 | 1/2004 | Deak | 360/290 |

* cited by examiner

*Primary Examiner*—Craig A. Renner
(74) *Attorney, Agent, or Firm*—Zilka-Kotab, PC

(57) ABSTRACT

A double tunnel junction TMR magnetoresistive sensor having first and second magnetic free layers separated by a self pinned magnetic layer. The self pinned magnetic layer is separated from the first and second free layers by thin barrier layers. The pinned layer magnetization is pinned without the need for exchange pinning with an adjacent layer of antiferromagnetic layer.

12 Claims, 5 Drawing Sheets

DOUBLE TUNNEL JUNCTION USING SELF-PINNED CENTER FERROMAGNET

FIELD OF THE INVENTION

The present invention relates to magnetoresitive sensors and more particularly to a double tunnel junction sensor having a self central self pinned layer.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Box$, where $\Box$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer). A pinning layer in a bottom spin valve is typically made of platinum manganese (PtMn). The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Sensors can also be categorized as current in plane (CIP) sensors or as current perpendicular to plane (CPP) sensors. In a CIP sensor, current flows from one side of the sensor to the other side parallel to the planes of the materials making up the sensor. Conversely, in a CPP sensor the sense current flows from the top of the sensor to the bottom of the sensor perpendicular to the plane of the layers of material making up the sensor.

In order to increase data density and data rate even further, in recent years researchers have focused on the use of tunnel junction (TMR) sensors or tunnel valve. A TMR sensor employs an electrically insulating spacer layer rather than a conductive spacer layer. A tunnel valve operates based on quantum mechanical tunneling of electrons through the insulating spacer layer. This tunneling is maximized when the magnetizations of the free and pinned layers are parallel to one another adjacent to the spacer layer.

The incredibly demanding data storage industry requires every increasing data densities and data rates from storage products such as disk drives. Meet these data capacity demands requires increasing the ratio of resistance change to total resistance dr/R of a sensor, which is the most significant measure of the performance of a sensor. One way to increase the dr/R of a TMR sensor is to construct the sensor as a double TMR sensor. Some researchers have constructed such a double TMR sensor as a free layer sandwiched between two pinned layers and separated from pinned layers by first and second barrier layers. Researchers have also found that if the central layer is made very thin, this can greatly increase the dr/R of the TMR sensor.

However, constructing a TMR sensor with a very thin free layer has its limitations. If the free layer is made very thin it will saturate in the presence of the magnetic field from the medium. Such saturation leads to excessive signal noise and cannot be tolerated in a sensor design.

Therefore, there is a need for magnetic sensor that can improve dr/R performance over that provided by state of the art sensors. Such a sensor would preferably take advantage of the improved performance provided by the use of a double TMR sensors and also take advantage of the increased dr/R properties of using a very thin central magnetic layer in a double TMR design.

SUMMARY OF THE INVENTION

The present invention provides a dual tunnel junction magnetoresistance sensor (TMR) having a self pinned layer at its center and first and second free layers disposed at either side thereof. The pinned layer is self pinned, which means that it does not require exchange coupling with an antiferromagnetic layer. The pinned layer is separated from the first and second free layers by first and second electrically insulating barrier layers.

Advantageously, because the pinned layer is self pinned, it can be constructed to be very thin. This takes advantage of the dr/R improvements that can be realized by having a thin ferromagnetic layer at its center.

Also, since the saturation of the pinned layer is not an issue, the centrally disposed pinned layer can be constructed very thin without the magnetic saturation problems that would exist if the thin central layer were a free layer.

The pinned layer can be constructed to be self pinned by making it of CoFe having 20 to 50 atomic percent Fe. Preferably, the pinned layer is constructed of a single layer of $Co_{50}Fe_{50}$ or of a CoFe having atomic percentages approximately 50 atomic percent Fe and 50 atomic percent Co. Alternatively, the pinned layer could be constructed as a tri-layer structure having a three layers of magnetic material, such as CoFe separated from on another by first and second non-magnetic coupling layers. The non-magnetic coupling layers could be for example Ru.

The barrier, layer can be constructed of aluminum oxide or alternatively of magnesium oxide. The free layers can be constructed of CoFe or could also be constructed of layers of CoFe and NiFe. If the free layers are constructed of layers of CoFe and NiFe, the CoFe layer is preferably located adjacent to the pinned layer.

If the pinned layer is constructed as a single magnetic layer, it can be for example 5 to 15 angstroms thick. Alternatively, if the pinned layer is constructed as three magnetic layers separated from one another by non-magnetic coupling layers, the outer layer can be for example about 5 angstroms thick each and the inner ferromagnetic layer can be for example about 10 angstroms thick.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
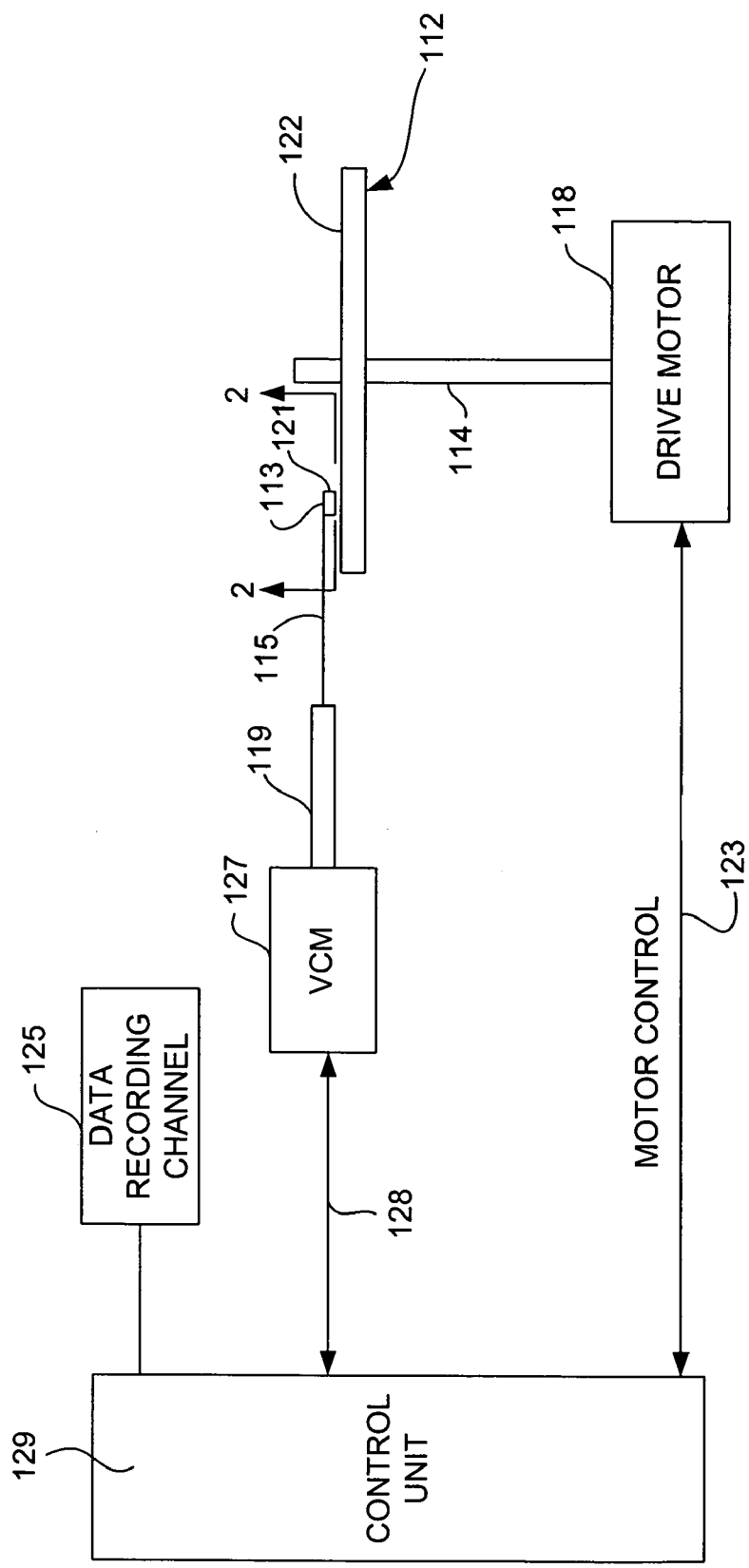
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
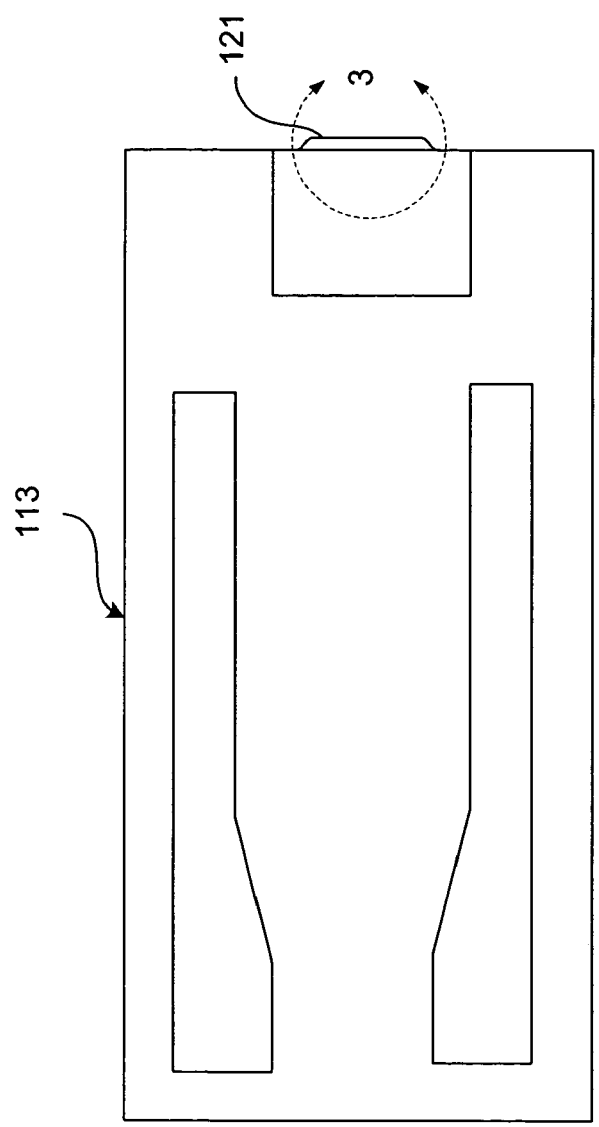
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
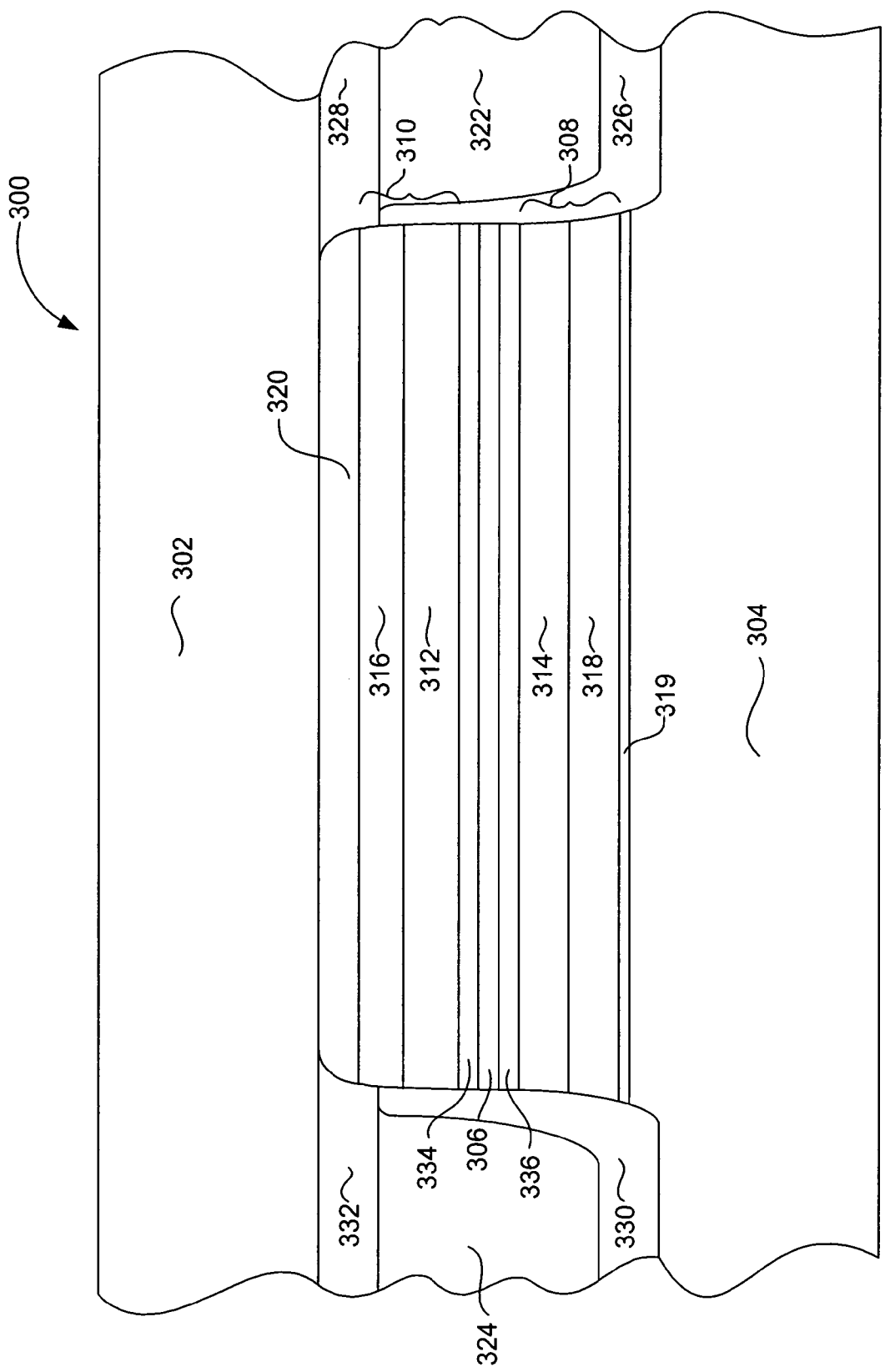
FIG. 3 is an ABS view of a magnetic sensor according to an embodiment of the present invention taken from circle 3 of FIG. 2.

With reference now to FIG. 3, a tunnel junction magnetoresistive sensor according to an embodiment of the present invention is described. The TMR sensor 300 includes first and second shields 302, 304 that also function as electrodes to provide sense current to the sensor 300, the sense current being conducted through the sensor 300 perpendicular to the various layers of the sensor 300. The TMR sensor 300 includes a self pinned layer 306 sandwiched between first and second free layers 308, 310. In the presently described embodiment, the pinned layer 306, comprises a single layer of a magnetic material having a high magnetostriction. The pinned layer 306 is self pinned in that it is pinned by a combination of high magnetostriction and intrinsic compressive stress in the sensor 300. Pinning is also assisted by a relatively high magnetic coercivity of the magnetic material making up the pinned layer 306. The pinned layer is preferably constructed of $Co_{50}Fe_{50}$, of a material having about 50 atomic percent Co and 50 atomic percent Fe. However, the pinned layer could also be constructed of a material comprising Co and Fe wherein the percentage of Fe ranges from 20% to 60%. Alternatively, the pinned layer could be constructed of a material comprising Co, Fe and V wherein the percentage of V is about 2 to 10 atomic percent. It will be appreciated that, because the pinned layer 306 is self pinned, it can be constructed to be very thin. Preferably the pinned layer 306 has a thickness of 5 to 10 angstroms.

The free layers 308, 310 can be constructed of many suitable materials familiar to those skilled in the art. For example, the free layer could be constructed of CoFe or NiFe. However, preferably each free layer 308, 310 includes a layer of CoFe 312, 314, and a layer of NiFe 316, 318. Preferably, the CoFe layer 312, 314 of each free layer 308, 310 is disposed closest to the pinned layer 306 as shown in FIG. 3. A layer of Ta 320, or some other capping layer, can be provided at the top of the sensor 300 to prevent corrosion and protect the sensor 300. In addition, a seed layer 319 may be provided under the free layer 308 in order to ensure the proper crystal structure of the layers formed there above. The seed layer 319 may be constructed of for example, NiFeCr, Ta, Cu or Ru.

First and second hard bias layers 322, 324 are provided at either side of the sensor 300 to provide magnetic biasing for the free layers. The hard bias layers 322, 324 are constructed of a high coercivity material such as CoPtCr or some other suitable material. Insulation layers 326, 328, 330, 332 are provided above and below the hard bias layers 322, 324 to prevent current shunting across the hard bias layers 322, 324. It should be pointed out that the hard bias layers 322, 324 should be thick enough to contact align with at least a portion of the edges of the free layers 308, 310.

The free layers 308, 310 are separated from the pinned layer 306 by very thin, non-magnetic, electrically insulating barrier layers 334, 336. These barrier layers could be constructed of for example aluminum oxide $Al_2O_3$ or Magnesium Oxide $MgO_x$.

It will be appreciated that the embodiment described above takes advantage of the increased dr/R associated with the use of a thin central magnetic layer in a TMR sensor, while avoiding the free layer saturation issued experienced with the use of a central free layer in a dual TMR sensor. Making the pinned layer self pinned allows the pinned layer to be constructed very thin.

Figure 4:
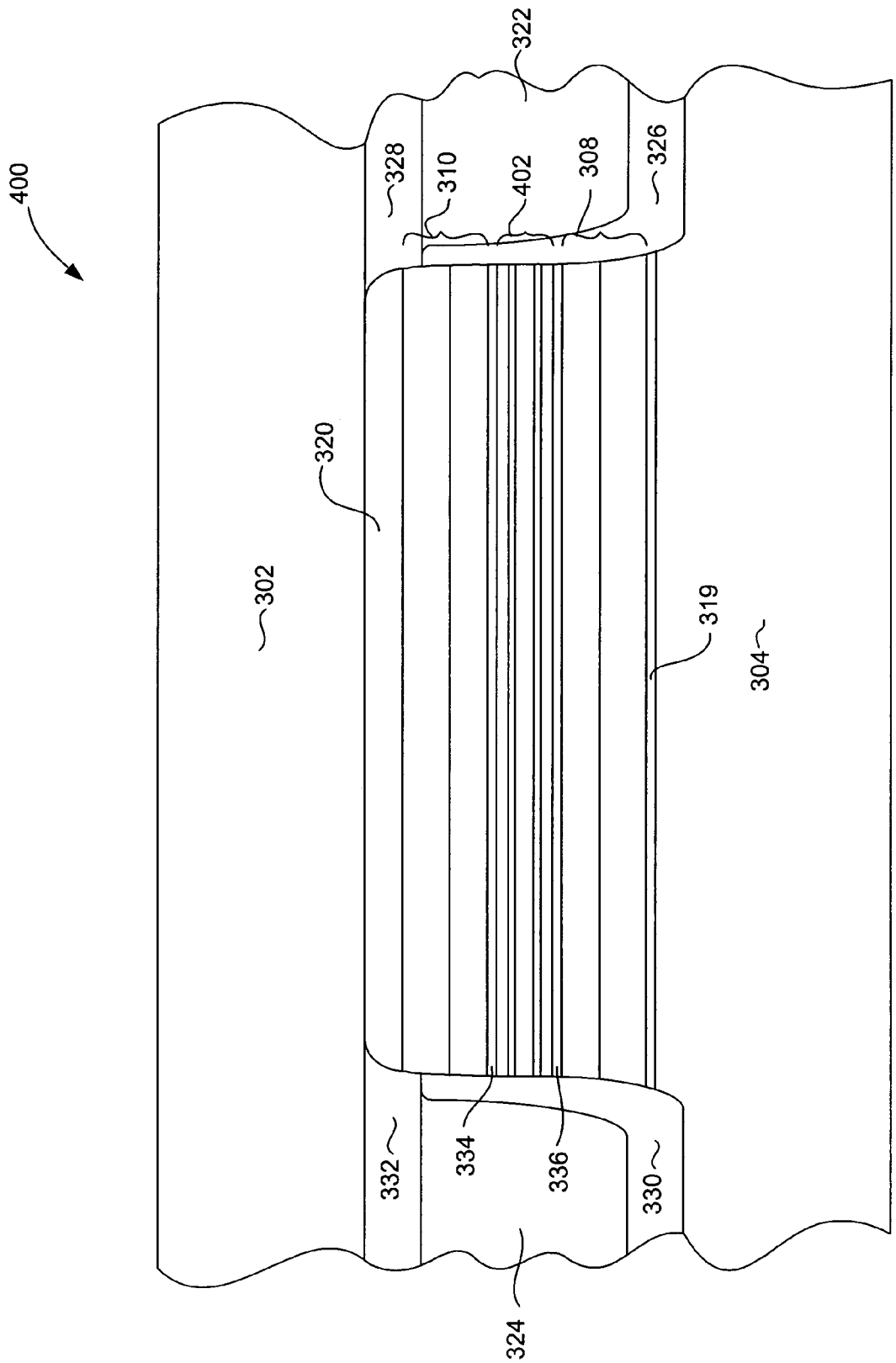
FIG. 4 is an ABS view of a magnetic sensor according to an alternate embodiment of the invention.
Figure 5:
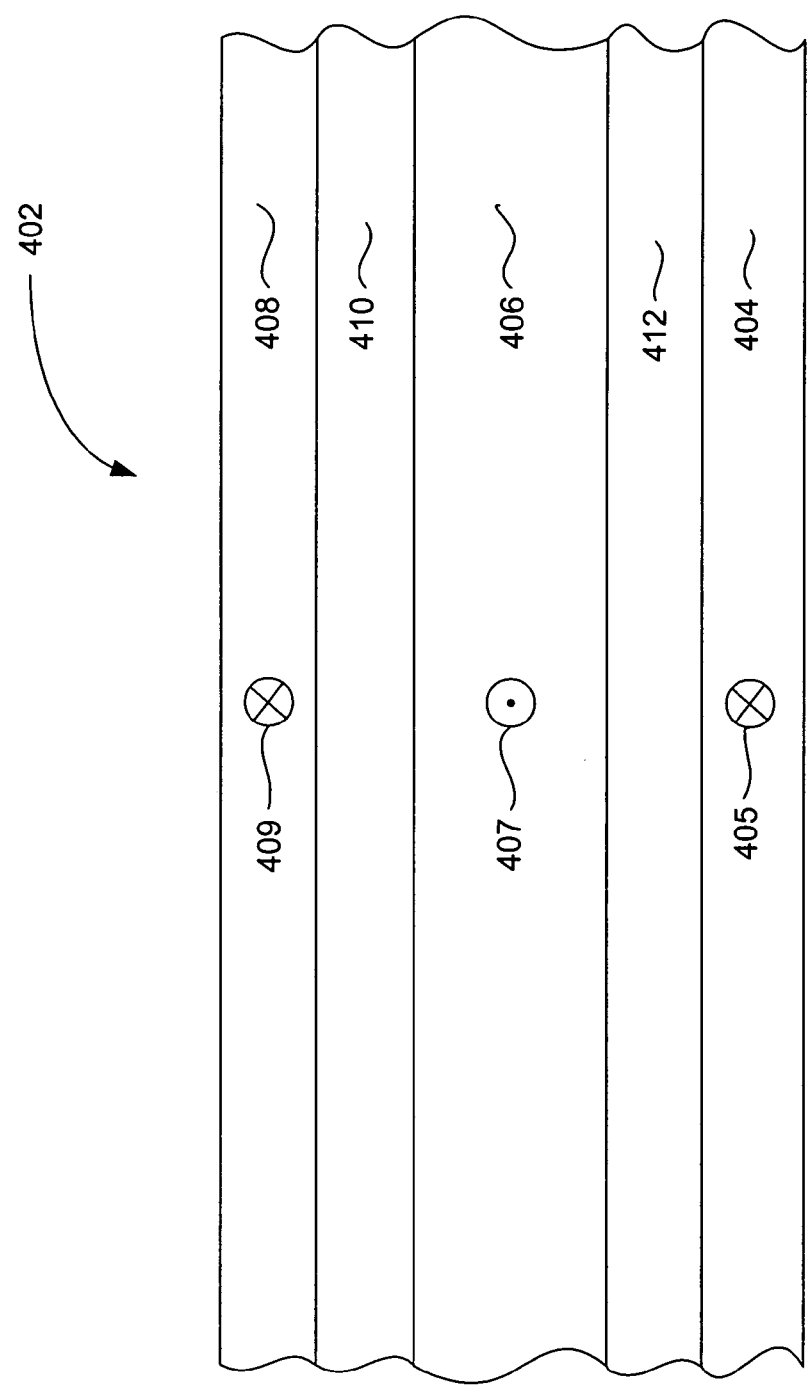
FIG. 5 is an enlarged view of a pinned layer of the embodiment described with reference to FIG. 4.

With reference now to FIG. 4, in an alternate embodiment of the invention, the sensor 400 includes a pinned layer 402 constructed as multilayer structure, such as three magnetic layers 404, 406, 408 separated by non-magnetic coupling layers 410, 412 such as Ru. The structure of the multilayer pinned layer 402 can be seen more clearly with reference to FIG. 5, wherein the pinned layer is shown enlarged and in isolation.

The magnetic layers 404, 406, 408 are antiparallel coupled across the coupling layers 410, 412. By using an odd number of magnetic layers 404, 406, 408 the magnetizations of the outer layers 404, 408 can be in phase, being in the same direction as one another and providing an additive GMR effect for the sensor 400. The magnetizations of the magnetic layes 404, 406, 408 are indicated for example by symbols 405, 407, 409 In the presently described embodiment, the outer magnetic layers 404, 408 of the pinned layer 402 can be for example about 5 angstroms thick and the center magnetic layer can be about 10 angstroms thick. As with the previously described embodiment, the magnetic layers 404, 406, 408 of the pinned layer 402 can be constructed of CoFe having about 50 atomic percent Fe and 50 atomic percent Co. Also as with the previously described embodiment the magnetic material layers 404, 406, 408 could be constructed of a material comprising Co and Fe with 20 to 60 atomic percent Fe or could also be constructed of a material comprising Co, Fe and V and could contain about 20 to 10 atomic percent V.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetoresistive sensor comprising:
   first and second magnetically free layers;
   a magnetically pinned layer sandwiched between the first and second free layers, said magnetically pinned layer being self pinned;
   a first electrically insulating barrier layer sandwiched between said first magnetically free layer and said pinned layer; and
   a second electrically insulating barrier layer sandwiched between said second free layer and said pinned layer;
   wherein said pinned layer comprises first two outer ferromagnetic layers and one inner ferromagnetic layer, the outer and inner ferromagnetic layers comprising Co and Fe, said outer ferromagnetic layers having a thickness of about 5 angstroms and said inner ferromagnetic layer having a thickness of about 10 angstroms.

2. A magnetoresistive sensor as in claim 1 wherein said pinned layer comprises Co and Fe, wherein the atomic percent of Fe is about 50%.

3. A magnetoresistive sensor as in claim 1 wherein said pinned layer comprises CoFe with an atomic percent of Fe ranging from 20 to 60 percent.

4. A magnetoresistive sensor as in claim 1 wherein said pinned layer comprises CoFeV, with an atomic percent of Fe ranging from 20 to 60 percent and an atomic percent of V ranging from 2 to 10 percent.

5. A magnetoresistive sensor as in claim 1 wherein said ferromagnetic layers of said pinned layer comprise Co and Fe and wherein the atomic percent of Fe in each layer is 20 to 60 percent.

6. A magnetoresistive sensor as in claim 1 wherein said ferromagnetic layers of said pinned layer comprise Co, Fe and V and wherein the percentage of Fe in each layer ranges from 20 to 60 percent and wherein the atomic percentage of V ranges from 2 to 10 percent.

7. A magnetoresistive sensor as in claim 1, wherein said barrier layers comprise Aluminum Oxide.

8. A magnetoresistive sensor as in claim 1, wherein said barrier layers comprise magnesium oxide.

9. A magnetoresistive sensor as in claim 1 wherein at least one of said free layers comprises CoFe.

10. A magnetoresistive sensor as in claim 1, wherein at least one of said free layers comprises a layer of CoFe and a layer of NiFe, the CoFe layer being disposed closer to the pinned layer than the NiFe layer.

11. A magnetoresistive sensor as in claim 1 wherein said ferromagnetic layers of said pinned layer are separated from one another by first and second non-magnetic coupling layers.

12. A magnetoresistive sensor as in claim 1 wherein said ferromagnetic layers of said pinned layer are separated from one another by first and second non-magnetic coupling layers comprising Ru.

* * * * *